(12) United States Patent
Broughton et al.

(10) Patent No.: US 6,213,687 B1
(45) Date of Patent: Apr. 10, 2001

(54) SYSTEM FOR PREVENTING EROSION OF SOIL SURFACES

(76) Inventors: Amos Washington Broughton, 5645 Persimmon Ave., Temple City, CA (US) 91730; Robert Steven Broughton, 3184 Deer Valley Ave., Newbury Park, CA (US) 91320

( * ) Notice: Subject to any disclaimer, the term of this patent is extended or adjusted under 35 U.S.C. 154(b) by 0 days.

(21) Appl. No.: 09/364,437

(22) Filed: Jul. 30, 1999

(51) Int. Cl.[7] .............................. E02B 3/12; E02D 19/00
(52) U.S. Cl. .......................... 405/258; 405/16; 405/19; 405/21; 405/25; 405/32; 405/35; 52/DIG. 9
(58) Field of Search ................... 405/16, 19, 21, 405/24, 25, 29, 30, 32, 35, 258; 52/DIG. 9

(56) References Cited

U.S. PATENT DOCUMENTS

| | | | |
|---|---|---|---|
| 4,080,793 | * | 3/1978 | Pulsifer .................................. 405/30 |
| 4,142,821 | * | 3/1979 | Doring ................................. 405/258 |
| 4,801,217 | * | 1/1989 | Goldberg ........................ 405/258 X |
| 4,946,308 | * | 8/1990 | Chevalier ........................... 405/32 X |
| 5,024,560 | * | 6/1991 | Reilly ................................. 405/16 X |
| 5,160,215 | * | 11/1992 | Jensen ................................ 405/16 X |
| 5,178,489 | * | 1/1993 | Suhayda ................................. 405/21 |
| 5,364,206 | * | 11/1994 | Marienfeld ............................. 405/16 |
| 5,746,545 | * | 5/1998 | Parker, Jr. ........................... 405/258 |
| 5,795,106 | * | 8/1998 | Herd .................................. 52/DIG. 9 |

* cited by examiner

*Primary Examiner*—Eileen D. Lillis
*Assistant Examiner*—Tara L. Mayo

(57) ABSTRACT

A system for preventing erosion and release of chemicals from exposed soil, the system including a pattern of horizontally-disposed, closely-spaced tires substantially filled and surrounded by inorganic fill material for limiting efflux of the exposed soil surface. In a first preferred embodiment, the system comprises the array of tires with an underlayment of open-weave lyophobic textile covering the soil surface. In a second preferred embodiment, the system comprises the array of tires with an underlayment of open-weave lyophobic textile and a fixated fill material for the individual tires with the top of the horizontally-disposed area of exposed fixated fill material containing a surface layer of water-soluble inorganic aggregate.

13 Claims, 5 Drawing Sheets

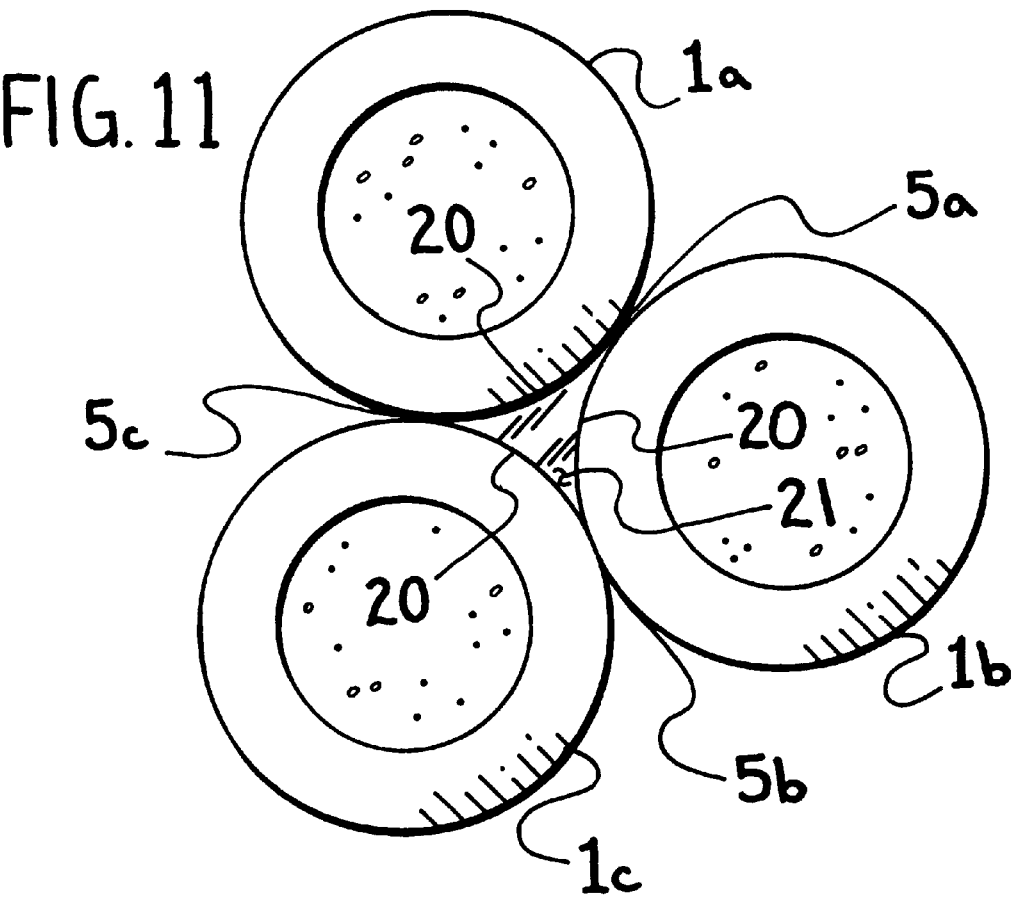

SYSTEM FOR PREVENTING EROSION OF SOIL SURFACES

BACKGROUND OF THE INVENTION

Several environmental disasters in existence today(1999) are the Aral Sea in the former Soviet Union and certain dry lakes in the United Stated of America.

The waters of the Aral Sea have been drained for irrigating cotton by the former owners of the land, the Soviet Communists. The exposed seabed dried up and a surface later of arsenic-rich material formed thereon. Winds blow this arsenic-laden dust into all areas of the villages, towns and cities surrounding this freshwater sea.

Large numbers of people in the area surrounding the historic Aral Sea shoreline suffer from all manner of airborne diseases.

Dry lakes in the United States formed when their water sources were lost due to natural of artificial causes, exhibit a similar phenomenon, with similar attendant effects on surrounding human populations.

The toxic dust described above comprises the first of three growing environmental problems that require immediate solutions, as they collectively constitute a real and present danger to the health of our citizenry.

The second growing environmental problem is a huge quantity of used rubber automobile tires. There is presently no known use, system, or process that can begin to keep up with the quantity of used tires currently being generated.

There are over 30,000,000 used rubber automobile tires generated every year in the State of California, and over 200,000,000 used rubber tires generated annually in the United States of America. These tires continue to accumulate as ugly mountains that are combustible, growing environmental hazards.

The third environmental problem is the mountains of coal clinker and blast furnace clinker surrounding past steelmaking operations, long-since abandoned after World War II. As in the case of automobile tires, there is no known use for these clinker materials that can begin to rid the environment of them. Thus they remain a blight on surrounding communities.

The instant invention is designed to alleviate the suffering of the peoples who live in these areas by permanently suppressing the toxic dust clouds. This innovate layment process requires the use of closely spaced, fixated aggregate filled, used rubber tires, anchoring a continuous, lyophobic, open weave, fabric underlayment, thus providing an economic need for limitless amounts of used rubber tires and clinker.

Other benefits of this invention will become apparent from the drawings, detailed description of the drawings and claims that comprise the application for the invention.

BRIEF SUMMARY OF THE INVENTION

In operation the invention provides for effective coverage of the surface of a dry lake bed through the utilization of fixated aggregate-filled tires, each resting on one sidewall, providing complete surface-blocking from ingress of water or erosion by water or wind, and anchoring the entire open weave lyophobic fabric underlayment, while permitting any rain to pass through the interstitial open areas formed by the tangentially-touching juxtaposition of any three of the tires arrayed in this generally horizontally coplanar manner.

This array of tires and fabric, when continued throughout the area of dry lake bed, covers and protects it against water and wind erosion, while preventing efflux of the soil surface. Three economically-important environmental objectives are met by this process.

The first object of the present invention is to prevent soil erosion and the dangerous release of harmful chemicals from lake beds.

The second object of the present invention is to utilize used rubber automobile tires in sufficient quantities to not only keep up with those being discarded, but to deplete the existing stored surplus.

The third object of the present invention is to utilize existing mountains of coal and blast furnace clinker to return their current sites to productive use.

The present invention provides maximum surface area coverage with a minimum(but necessary) open space between tires; permitting rain water easy ingress into the dry lake bed surface through the open weave underlayment of fabric without flash flooding, thus keeping the arsenic dusts effectively secured beneath the construction.

When high velocity winds blow over this inventive construction, the dust layer is prevented from rising into the atmosphere. When rained on, the construction prevents surface efflux of the dusts through flash flooding.

The dispersion of the used rubber tires containing various fixated aggregates is accomplished in such a way as to eliminate the necessity of interconnections between tires.

BRIEF DESCRIPTION OF THE DRAWINGS

FIG. 11 is a top view of a geometric explanation of system use.

DETAILED DESCRIPTION OF THE DRAWINGS

Figure 1:
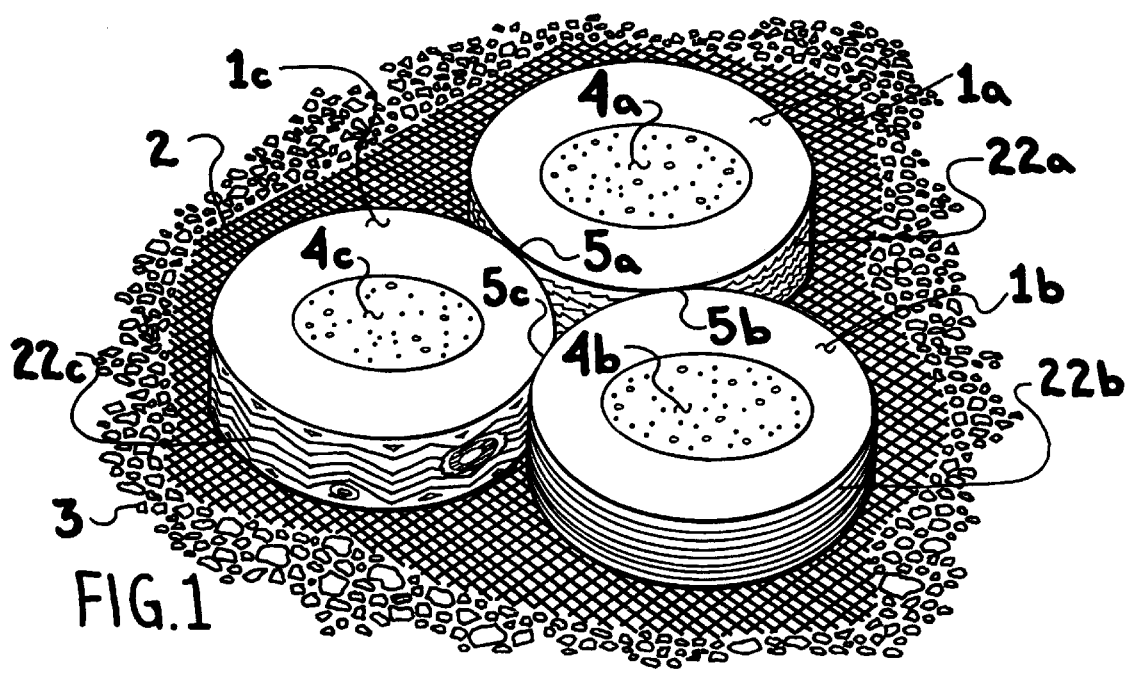
FIG. 1 is a perspective view of the erosion-preventive system.

In FIG. 1 a perspective view of the basic unit of the preferred erosion prevention system is shown, comprising three rubber tires 1a, 1b, 1c, filled with concrete 4a, 4b, 4c respectively and with the tires resting in a horizontal coplanar manner with tire treads 22a, 22b, touching tangentially at point 5b, tire treads 22a, 22c touching tangentially at point 5a and tire treads 22b, 22c touching tangentially at point 5c, with the basic unit as comprised above resting on a lyophobic open weave fabric 2 of continuous underlayment resting on a substantially horizontally level soil surface 3.

Figure 2:
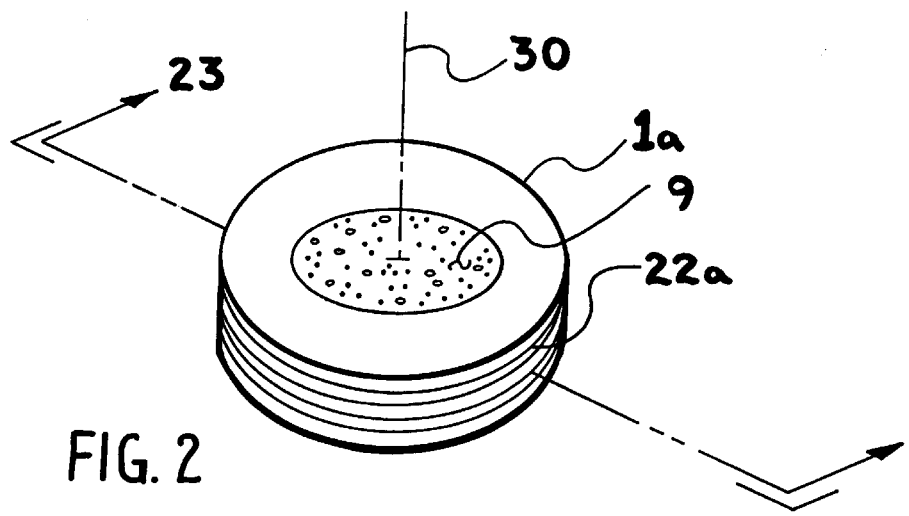
FIG. 2 is a perspective view of a concrete-filled rubber tire.

In FIG. 2 a perspective view of a rubber tire 1a is shown, with tire tread 22a, and filled with concrete 9, includes a vertical sectional indicator line 23—23 through a typical tire centerline 30 which locates and refers to the cross sections shown in FIGS. 3, 4, 5, 6, 7, and 8.

Figure 3:
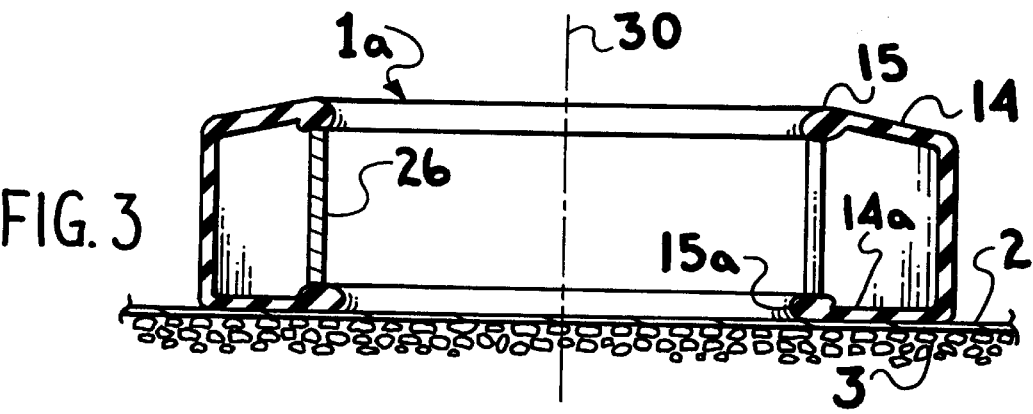
FIG. 3 is a cross-section view of an empty tire with extended upper sidewall.

In FIG. 3 a cross-section of a unfilled rubber tire 1a is shown, with an upper sidewall 14 and rim bead 15 extending conically upwards with respect to the tire centerline 30 and with the lower tire sidewall 14a and lower rim bead 15a tire resting horizontally on an open-weave lyophobic fabric underlayment 2, and the total construction resting on an essentially horizontally level soil surface 3 with a plurality of rim bead spreader means 26 shown in their preferred positions.

Figure 4:
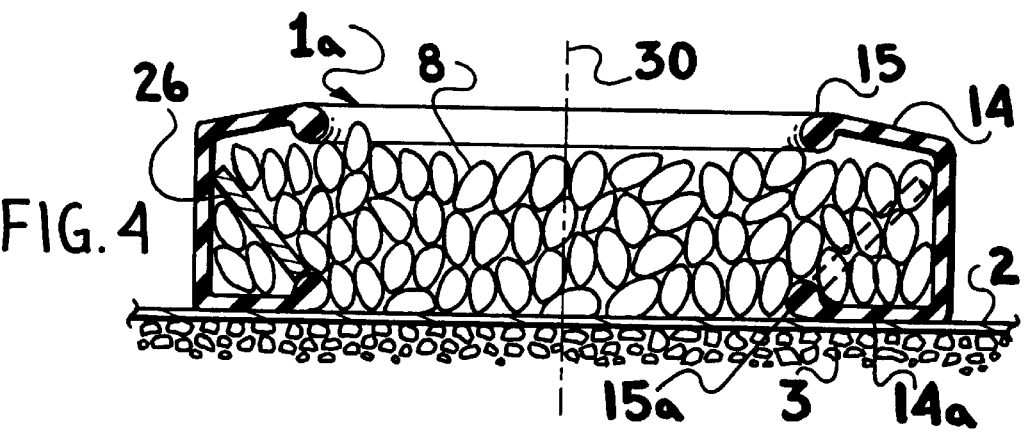
FIG. 4 is a cross-section view of a rubber tire partially filled with coal clinker and/or steel mill clinker aggregate.

In FIG. 4 a cross section of a rubber tire 1a with an upper sidewall 14 and rim bead 15 extending conically upwards with respect to the tire centerline 30 and with the lower tire side wall 14a and lower rim bead 15a resting horizontally on an open-weave lyophobic fabric underlayment 2, with the total construction resting on an essentially horizontally level soil surface 3 is shown filled with loose coal clinker and/or steel mill blast furnace clinker 8, and with the rim bead spreader means 26 forced generally outwardly by the ingress of the loose coal clinker and/or steel mill blast furnace clinker 8.

Figure 5:
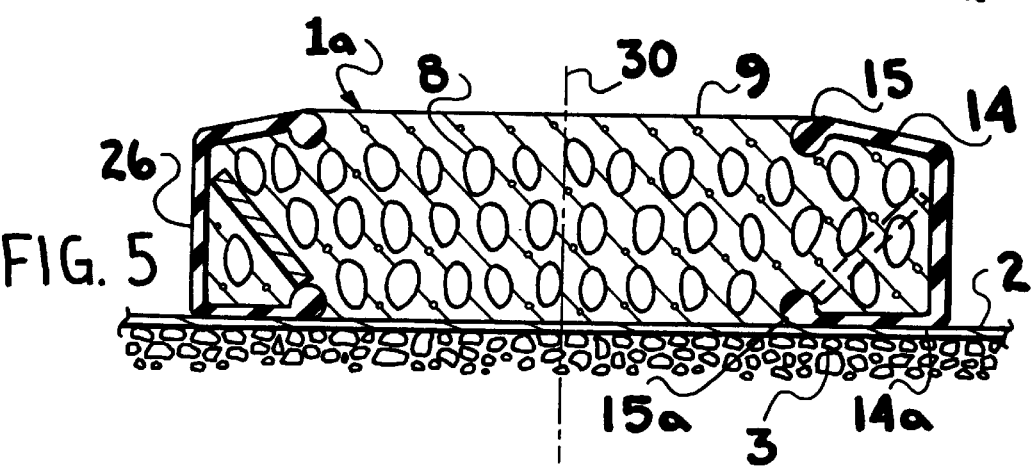
FIG. 5 is a cross-section view of a rubber tire completely filled with concrete surrounding the coal clinker and/or steel mill clinker aggregate.

In FIG. 5 a cross section of a rubber tire 1a with an upper sidewall 14 and rim bead 15 extending conically upwards with respect to the tire centerline 30 and with the lower tire sidewall 14a and lower rim bead 15a resting horizontally on an open-weave lyophobic fabric underlayment 2, with the total construction resting on an essentially horizontally level soil surface 3 is shown with concrete 9 surrounding the loose coal clinker and/or steel mill blast furnace clinker 8.

Figure 6:
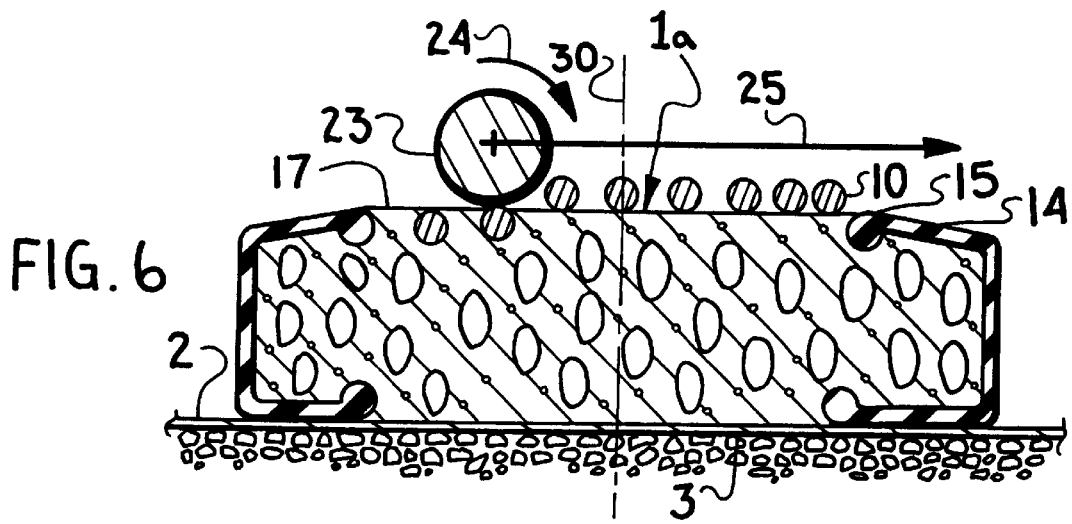
FIG. 6 is a cross-section view of a rubber tire filled with wet concrete, coal clinker and/or steel mill clinker aggregate, receiving a calendered top layer of soluble inorganic aggregate.

In FIG. 6 a cross section of a rubber tire 1a with an upper sidewall 14 and rim bead 15 extending conically upwards with respect to the tire centerline 30 and with the lower tire sidewall 14a and lower rim bead 15a resting horizontally on an open-weave lyophobic fabric underlayment 2, with the total construction resting on an essentially horizontally level soil surface 3 is shown with a calendering means 23 moving arcuately 24 in a horizontal direction 25 forcing a water soluble aggregate 10 into the top surface of wet concrete 17, substantially but not completely immersing the water soluble aggregate 10.

DETAILED DESCRIPTION OF THE DRAWINGS

Figure 7:
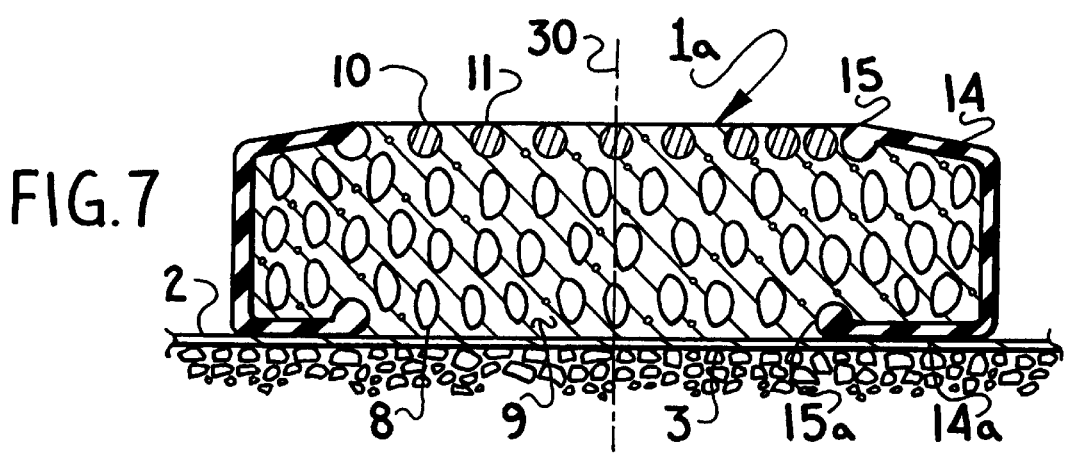
FIG. 7 is a cross-section of a rubber tire filled with concrete, coal clinker and/or steel mill clinker aggregate, and a calendered top layer of soluble inorganic aggregate.

In FIG. 7 a cross section of a rubber tire 1a with an upper sidewall 14 and rim bead 15 extending conically upwards with respect to the tire centerline 30 and with the lower tire sidewall 14a and lower rim bead 15a resting horizontally on an open-weave lyophobic fabric underlayment 2, with the total construction resting on an essentially horizontally level soil surface 3 is shown with cured concrete 9 surrounding coal clinker and/or steel mill blast furnace clinker 8 and water soluble aggregate 10.

Figure 8:
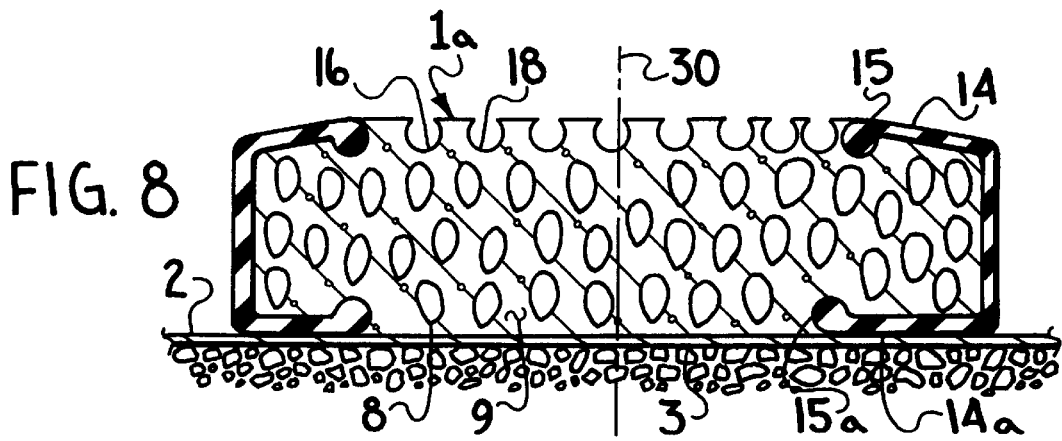
FIG. 8 is a cross-section of a used rubber tire filled with concrete, coal clinker and/or steel mill clinker aggregate, and with a dissolved absence of water-soluble aggregate.

In FIG. 8 a cross section of a rubber tire 1a with an upper sidewall 14 and rim bead 15 extending conically upwards with respect to the tire centerline 30 and with the lower tire sidewall 14a and lower rim bead 15a resting horizontally on an open-weave lyophobic fabric underlayment 2, with the total construction resting on an essentially horizontally level soil surface 3 is shown with cured concrete 9 surrounding coal clinker and/or steel mill blast furnace clinker 8 with an absence 16 of water soluble aggregate 10 and with the cavity 16 formed by the absence of the water soluble aggregate 10 substantially open 18 to the surrounding environment.

Figure 9:
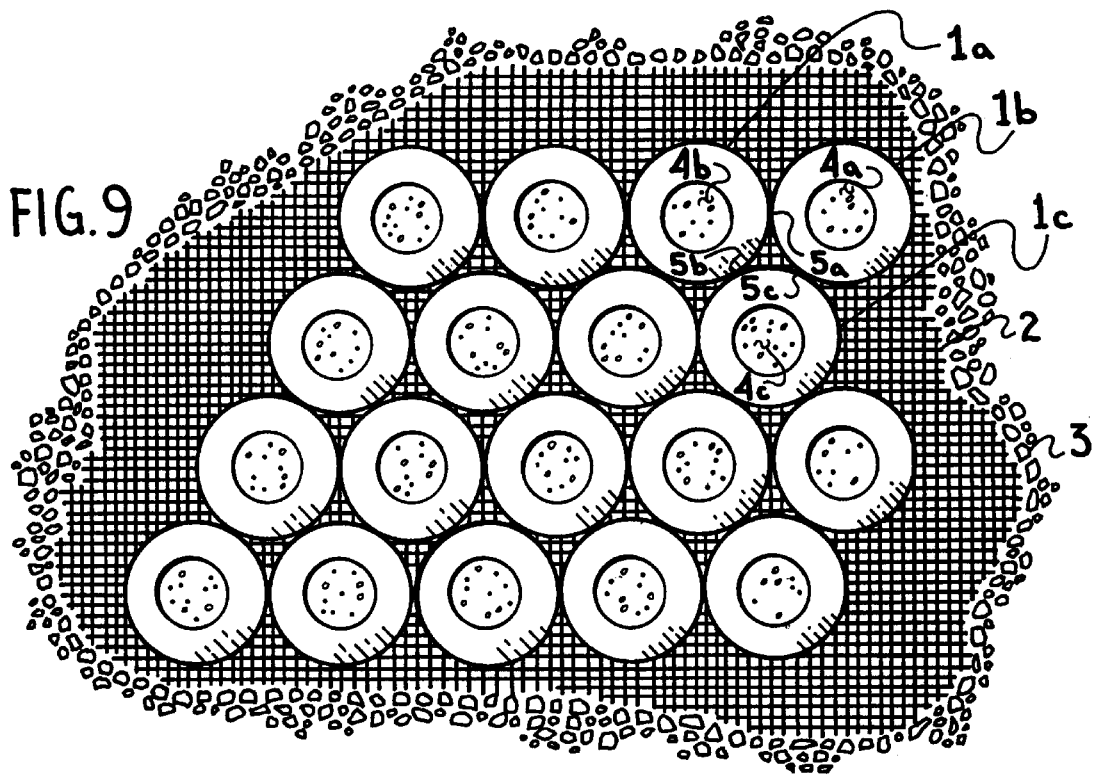
FIG. 9 is an expanded top view of the erosion-preventive system.

In FIG. 9 a larger area of the substantially horizontally level soil surface 3 is shown with a lyophobic open weave fabric 2 disposed across the essentially horizontally level soil surface 3 on which is shown a larger number of rubber tires typified by 1a,1b,1c each filled with concrete and aggregate 4a,4b,4c and whose sidewalls are typically touching at 5a,5b,5c.

Figure 10:
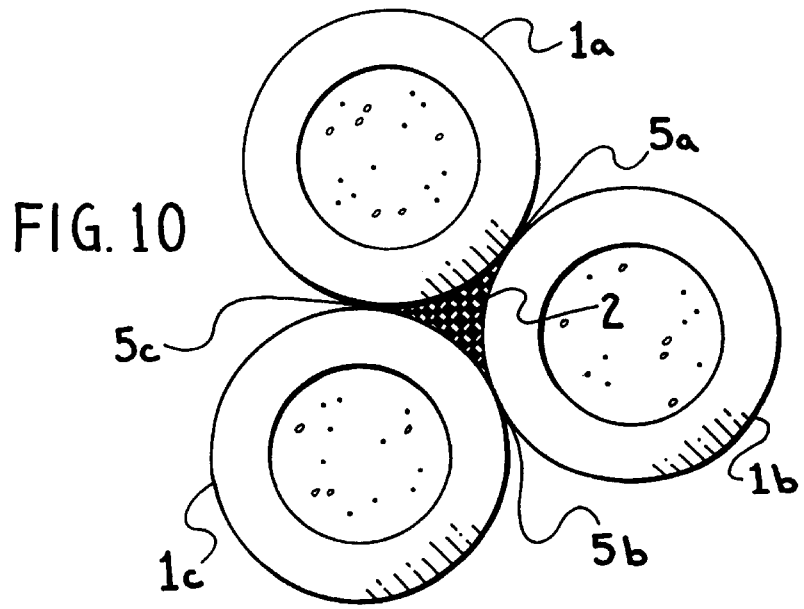
FIG. 10 is a top view of the smallest complete unit of the system.

In FIG. 10 a depiction of the underlayment of lyophobic open weave fabric 2 is shown illustrating the maximum area of the fabric that is exposed when rubber tires 1a,1b,1c, touch tangentially at points 5a, 5b, 5c, forming an equilateral concave sided triangular area.

In FIG. 11 a depiction similar to that of FIG. 10 is shown to illustrate the effective blocking of any collected liquids 21, such as rain, from exiting the equilateral concave sided triangular area 5a,5b,5c formed by the three arcuate sections 20, 20, 20 of rubber tires 1a, 1b, 1c while permitting gravity ingress of the collected liquids 21 through the lyophobic open weave underlayment fabric 2.

We claim:

1. A system for preventing erosion and release of chemicals from a soil surface comprising a lyophobic membrane adapted to extend across a generally horizontal soil surface; a plurality of tires having rim beads, said tires arranged in a planar array with each tire in proximity to or in contact with a plurality of other said tires; a spreader means vertically separating the beads of each tire; a fill material at least within each tire having an apparent density substantially greater than that of water; and interstices between adjacent tires wherein said plurality of tires are unconnected by any separate fastening means.

2. A system for preventing erosion and release of chemicals from a soil surface according to claim 1 in which the lyophobic membrane adapted to extend across the soil surface comprises an organic fabric.

3. A system for preventing erosion and release of chemicals from a soil surface according to claim 1 in which the tires in the planar array are in proximity to or in contact with six other said tires.

4. A system for preventing erosion and release of chemicals from a soil surface according to claim 1 in which the fill material within each tire is a cement aggregate mixture.

5. A system for preventing erosion and release of chemicals from a soil surface according to claim 1 in which the fill material within each tire is a loose aggregate.

6. A system for preventing erosion and release of chemicals from a soil surface according to claim 1 in which the fill material within each tire is coal clinker.

7. A system for preventing erosion and release of chemicals from a soil surface according to claim 1 in which the fill material within each tire is steel furnace clinker.

8. A system for preventing erosion and release of chemicals from a soil surface according to claim 1 in which said spreader means vertically separates the beads of each tire to the point where the uppermost rim bead is higher than the tire upper sidewall.

9. A system for preventing erosion and release of chemicals from a soil surface according to claim 1 wherein each said tire is in contact with a plurality of other said tires, and water can readily pass by gravity through a concave-sided triangular area formed by the contact of three arcuate sections of tangentially-touching rubber tire treads.

10. A system for preventing erosion and release of chemicals from a soil surface according to claim 1 in which said tires, said spreader means, said membrane, and said fill material are all substantially inert.

11. A system for preventing erosion and release of chemicals from a soil surface according to claim 1 in which the fill material within each tire is a cement aggregate containing an exposed water-soluble particulate in the upper horizontal planar surface.

12. A system for preventing erosion and release of chemicals from a soil surface according to claim 1 in which the fill material comprises concrete.

13. A system for preventing erosion and release of chemicals from a soil surface according to claim 1 in which any three tangentially-touching or in proximity tire treads in the array form a triangular open area with concave arcuate sides with respect to said area between the three tangentially-touching or proximal points of the tires.

* * * * *